May 6, 1924.

A. T. DEWEY 1,493,249

AUTOMATIC AIR PRESSURE GAUGE AND TIRE TESTER

Original Filed July 14, 1919

Inventor
Anson T. Dewey,

By G. Hume Talbot
Attorney

Patented May 6, 1924.

1,493,249

UNITED STATES PATENT OFFICE.

ANSON T. DEWEY, OF TOPEKA, KANSAS.

AUTOMATIC AIR-PRESSURE GAUGE AND TIRE TESTER.

Application filed July 14, 1919, Serial No. 310,687. Renewed September 28, 1922. Serial No. 591,191.

*To all whom it may concern:*

Be it known that I, ANSON T. DEWEY, citizen of the United States of America, residing at Topeka, in the county of Shawnee and State of Kansas, have invented new and useful Improvements in Automatic Air-Pressure Gauges and Tire Testers, of which the following is a specification.

The object of the invention is to provide an apparatus for use in connection with tire tubes and designed to serve interchangeably as an automatic air pressure gauge and as a tire tester, to the end that in its first named capacity it will serve as a means of controlling the extent of inflation of a tire tube or the extent of internal pressure applied thereto in the course of inflation, so that an over-inflation may be prevented, and in its second-named capacity it will serve as a means of enabling the operator to determine the amount of internal pressure, and enables him to reduce within definite limits the amount of pressure when demanded by the temperature or when it is desired to store the machine with the tire tubes inflated at a moderate pressure.

With these related objects in view as will appear in the course of the following description, the invention consists in a construction and combination of elements of which a practical and preferred embodiment is illustrated in the accompanying drawings, it being understood however, that changes in form and proportion may be resorted to without departing from the principles involved.

Figure 1:
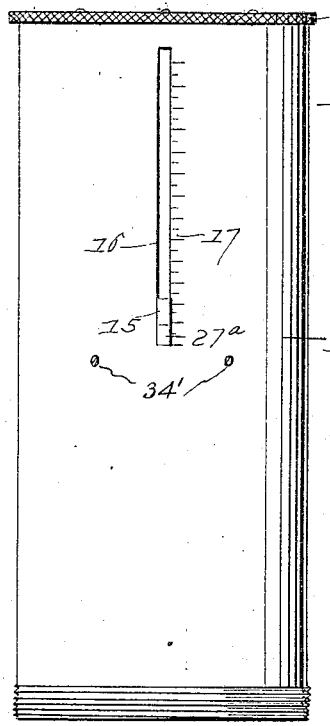
Figure 1 is a side view of a pressure gauge constructed in accordance with the invention.
Figure 2:
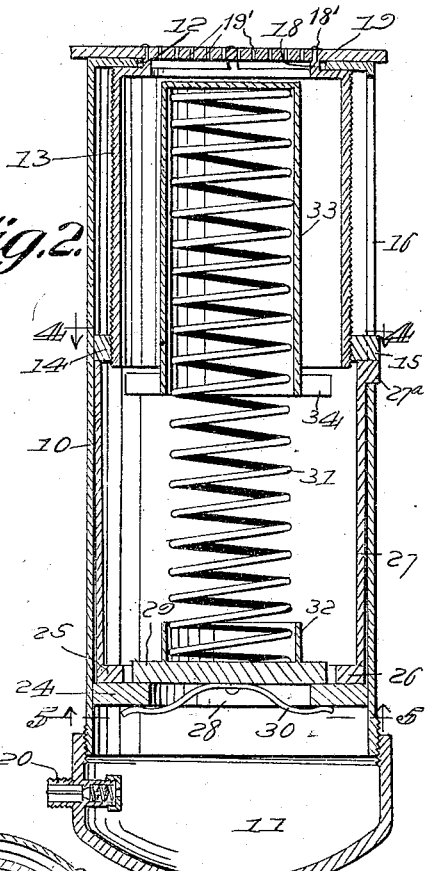
Figure 2 is a central longitudinal sectional view of the same.
Figure 3:
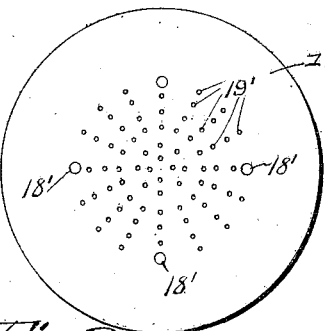
Figure 3 is a top plan view.
Figure 4:
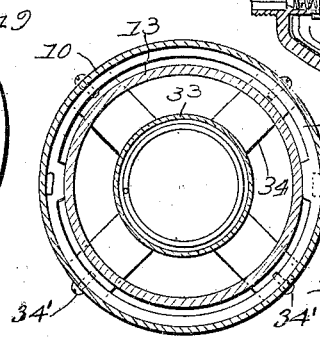
Figure 4 is a transverse section on the plane indicated by the line 4—4 of Figure 2.
Figure 5:
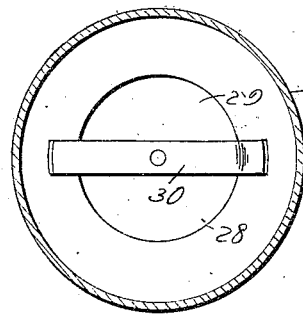
Figure 5 is a transverse sectional view on the plane indicated by the line 5—5 of Figure 2.

Within a cylindrical casing 10 which is open at its lower end and fitted with a cap 11 and is provided at its upper end with an opening 12, is located a sleeve 13 constituting an adjusting or feed member for a follower 14, the latter being constructed in the form of a ring with an index 15 projecting through a slot 16 in the casing and traversing a scale 17. The feed or adjusting member is exteriorly threaded as shown for engagement with the internal thread of the follower and is provided at its upper end with studs 18 which project through the opening 12 in the upper end of the cylinder and engage a disc 19 to which they are secured by fasteners 18', the disc constituting the element by which said feed member is rotated to adjust the follower. The disc or cap 19 is knurled on its periphery and is preferably provided with perforations 19' to form an outlet for air discharged as hereinafter explained, into the interior of the casing.

The head 11 is provided with a valve coupling 20 for the attachment of an air supply tube (not shown) which may be supplied by any suitable means such as a hand or power pump, and also in communication with the interior of said head is a coupling 21 for use in connection with the tube of a tire inflation valve. To this end the coupling 21 is provided with a tongue 22 for repressing the stem of the tire valve so as to provide for communication between the interior of the head 11 and the tire tube, and slidably and rotatably mounted on said coupling tube 21 is a cap nut 23 which may either be moved out of the way when it is desired merely to test the pressure in a tire tube, or may be used as the means of securing the gauge to the tire tube when it is desired to inflate the latter.

Mounted for reciprocatory movement in the cylinder casing of the gauge is a plunger 24 exposed to air pressure introduced through the inlet coupling 20 from the pump and mounted upon this plunger is a rider 25 consisting of a base ring 26 having a plurality of upwardly extending arms 27 which are adapted to contact terminally with the undersurface of the follower 14, the purpose of such contact being to afford in connection with the follower a stop or limiting device for the upward movement of the plunger, the point at which such movement is checked being dependent obviously upon the adjustment of the follower. One of the arms of the rider is provided with an index 27ª which also projects through the slot 16 in the wall of the casing to traverse the scale 17 and thus by means of suitable graduations on the latter indicate the pressure in the head 11 and hence in the tire tube when the latter is in communication with the gauge.

The plunger is provided with a valve opening 28 fitted with a valve 29 which is held in place yieldingly by a spring 30, and bearing upon the valve which is seated upon the upper surface of the plunger, and serving to yieldingly restrain the plunger, is a coiled pressure spring 31 which preferably is seated at its lower end in a cup 32 on the valve and extends upward into a thimble 33 disposed concentrically in the adjusting sleeve 13 to a seat at the upper end of said thimble, the latter being supported in the casing by means of the radial arms 34 which extend between and therefore do not interfere with the movement of the arms of the rider. Fasteners 34' pass through the walls of the casing and, entering the arms on the ends, serve to support them.

The arms of the rider have a spring tendency outward to afford a frictional contact with the inner surface of the casing so as to maintain the rider in an adjusted position to the end that after the application of pressure to the interior of the head as by applying the coupling 21 to a valve tube to determine its internal pressure, the rider will be advanced by the movement of the plunger, said rider will retain this adjusted position, after the return of the plunger to its normal position, to indicate to the operator the amount of pressure within the tube.

In the operation of the device as a means for regulating the pressure to be supplied to a tube, the follower ring 14 should be adjusted by means of the feed element 13 to dispose its under surface in such position with relation to the scale 17 as to indicate the pressure desired in the tube. The pressure may then be turned into the head, after the coupling of the gauge to the tire tube, and as the pressure increases the plunger will be advanced against the resistance offered by the spring 31 until the arms of the rider come in contact with the follower. This contact will prevent further movement of the plunger whereupon the pressure within the head will be applied to the valve 29 with the result that the latter will be unseated to expose the opening 28 and permit the excess air to be exhausted into the body of the cylinder from which it will find its escape through the outlets or vents 19'. These vents should be of such size as to permit the escape of the surplus air pressure while excluding dirt or other foreign matter which by lodging upon the valve seat might serve as a means of interfering with the proper operation of the parts.

If it is desired to ascertain what pressure is contained in a given tire tube it is only necessary to adjust the follower to such a point as to not interfere with the movement of the rider whereupon the application of the coupling 21 to the tire inflation tube will result in the movement of the plunger and hence of the rider to cause the index 27$^a$ of the latter to indicate such pressure.

In the same way if conditions should be such, due to the temperature of the atmosphere or of the tires, due to hard riding or the like, as to justify the reduction of pressure to a predetermined status within the tire tube, the rider may be depressed and the follower adjusted with relation to the scale to indicate the pressure which it is desired shall remain in the tire tube after reduction, whereupon the application of the coupling to the valve tube of the tire will permit the internal pressure thereof to be communicated to the plunger of the gauge to raise the latter until the arms of the rider come in contact with the follower, and the tire tube pressure then serving to open the relief valve 29, the excess pressure will escape until the desired reduction has been effected. It will be noted that the amount of reduction can thus be accurately determined in advance, and when the internal pressure of the tire tube reaches the point indicated by the adjustment of the follower, the valve 29 will seat, and further escape of air from the tire tube will be prevented.

Thus the inconveniences incident to reducing the tire tube pressure in the ordinary way or using the pump for a period and intermittently applying a tester to determine the pressure within the tube, with the result that either more or less pressure than is required has been the result of the previous operation, is avoided. In the inflation of a tube the follower may be set to that pressure which is desired and the inflation of the tube beyond that pressure is automatically prevented, and in the same way when it is desired to reduce the pressure, the setting of the follower results in the reduction to the exact pressure which has been predetermined, and the reduction ceases when that pressure has been reached.

On the other hand by temporarily removing the follower which in either of the before-mentioned operations serves as a stop to determine the point at which the relief valve will operate, it is possible to use the gauge as a pressure tester since the movement of the rider and the influence of the plunger will indicate with reference to the scale the axact pressure within the tube.

Claimed:—

A pneumatic pressure gauge comprising a casing, means for admitting air into the lower portion of the casing, a plunger slidably mounted in the casing and having an opening provided with a spring seating valve, the casing having a slot provided with graduations, a follower movable along the slot and having an index entering the slot, means operatively connecting the follower with the plunger, a spring housed within the casing and bearing upon the valve of the plunger and a sleeve journaled in the casing and having screw thread engagement with the follower.

In testimony whereof he affixes his signature.

ANSON T. DEWEY.